(12) United States Patent
Song et al.

(10) Patent No.: US 9,966,787 B2
(45) Date of Patent: May 8, 2018

(54) ELECTRONIC DEVICE WITH RESONATOR

(71) Applicant: Samsung Electronics Co., Ltd., Suwon-si (KR)

(72) Inventors: Keum-Su Song, Seoul (KR); Do-Won Kim, Suwon-si (KR); Sung-Bum Park, Suwon-si (KR); Jae-Hyun Park, Yongin-si (KR)

(73) Assignee: Samsung Electronics Co., Ltd. (KR)

( * ) Notice: Subject to any disclaimer, the term of this patent is extended or adjusted under 35 U.S.C. 154(b) by 149 days.

(21) Appl. No.: 14/987,575

(22) Filed: Jan. 4, 2016

(65) Prior Publication Data

US 2016/0197512 A1    Jul. 7, 2016

(30) Foreign Application Priority Data

Jan. 5, 2015    (KR) .................. 10-2015-0000700

(51) Int. Cl.

| | |
|---|---|
| *H01F 38/00* | (2006.01) |
| *H02J 7/02* | (2016.01) |
| *H02J 50/12* | (2016.01) |
| *H02J 7/00* | (2006.01) |
| *G02B 27/01* | (2006.01) |

(52) U.S. Cl.
CPC .......... *H02J 7/025* (2013.01); *G02B 27/0176* (2013.01); *H02J 7/0042* (2013.01); *H02J 50/12* (2016.02); *G02B 2027/0178* (2013.01)

(58) Field of Classification Search
None
See application file for complete search history.

(56) References Cited

U.S. PATENT DOCUMENTS

| | | | |
|---|---|---|---|
| 8,035,255 B2 | 10/2011 | Kurs et al. | |
| 2001/0043513 A1 | 11/2001 | Grupp | |
| 2010/0259110 A1* | 10/2010 | Kurs ................. | B60L 11/182 |
| | | | 307/104 |
| 2011/0241612 A1 | 10/2011 | Ryu et al. | |

(Continued)

FOREIGN PATENT DOCUMENTS

| | | |
|---|---|---|
| EP | 2387129 A2 | 11/2011 |
| EP | 2387129 A3 | 11/2011 |

(Continued)

OTHER PUBLICATIONS

Int'l Search Report and Written Opinion for PCT/KR2015/013537 dated Mar. 22, 2016.

(Continued)

*Primary Examiner* — Lincoln Donovan
*Assistant Examiner* — Khareem E Almo
(74) *Attorney, Agent, or Firm* — McAndrews, Held & Malloy, Ltd.

(57) ABSTRACT

Disclosed is an electronic device including a resonator that generates an induced current by electromagnetic coupling. The resonator includes a first conductor, a plurality of second conductors, a one end of each of the second conductors being electrically coupled to a first point of the first conductor, and an other end of each of the second conductors being electrically coupled to a second point of the first conductor, and at least one impedance load connected with the second conductors in series or in parallel. Thus, the resonator may generate current through the first and second conductors.

20 Claims, 13 Drawing Sheets

(56) References Cited

U.S. PATENT DOCUMENTS

| | | | |
|---|---|---|---|
| 2013/0007949 A1 | 1/2013 | Kurs et al. | |
| 2013/0214613 A1* | 8/2013 | Kobayashi | H02J 5/005 307/104 |
| 2014/0070625 A1 | 3/2014 | Kim et al. | |
| 2014/0077613 A1 | 3/2014 | Song et al. | |
| 2016/0079811 A1* | 3/2016 | Seo | H01P 7/08 307/104 |

FOREIGN PATENT DOCUMENTS

| | | |
|---|---|---|
| KR | 1020080036702 A | 4/2008 |
| KR | 100920012 | 10/2009 |
| KR | 1020120025808 A | 3/2012 |
| KR | 1020130075923 A | 7/2013 |

OTHER PUBLICATIONS

Extended European Search Report for KR Appln. No. 10-2015-0000700 dated Nov. 30, 2017 (7 pages).

\* cited by examiner

ELECTRONIC DEVICE WITH RESONATOR

RELATED APPLICATION(S)

This application claims the priority under 35 U.S.C. § 119(a) to Korean Application Series No. 10-2015-0000700, which was filed in the Korean Intellectual Property Office on Jan. 5, 2015, the entire content of which is hereby incorporated by reference.

BACKGROUND

Various embodiments of the present disclosure relate to an electronic device, and more particularly, to an electronic device that is provided with a resonator.

Due to the development of information communication technology, various types of electronic devices are utilized in people's daily lives, and the number of electronic devices owned by an individual user tends to increase. For example, an individual user may own a mobile communication terminal, a tablet personal computer (PC), an electronic scheduler, a portable multimedia reproducer, etc., and may use a suitable electronic device for a particular purpose or environment. An electronic device may be supplied with a wired power supply, and a portable electronic device also includes a battery pack so that it is possible to use the portable electronic device for a period of time even if the wired power supply is not connected.

However, since the capacity of the battery pack is limited, periodic charging or replacement of the battery pack may be required. Accordingly, each of the electronic devices may be provided with a charging device or a charging cable suitable for it, which may be the wired power supply. Accordingly, the individual user may own as many charging devices or charging cables, which correspond to the electronic devices, respectively, as electronic devices owned by the individual user. As the number of a user's electronic devices increases, the user may own an increasing number of accessories, such as charging devices. This burdens the user in that the user owns a plurality of accessories. Further, carrying the plurality of accessories is inconvenient.

However, when such electronic devices are charged via a wireless charger, the plurality of electronic devices may be charged with a single charging device, and thus lessens the user's burden and inconvenience. In order to enable wireless charging, it will be necessary to secure a stable power transmission/reception performance between the wireless charger and the battery being charged. For example, it will be necessary to sufficiently determine a distance that enables wireless power transmission/reception, and to secure sufficient power transmission/reception efficiency between a transmission side and a reception side within a predetermined distance.

SUMMARY

A wireless power transmission/reception device may transmit/receive power in a wireless manner using an electromagnetic field coupling between a primary resonator of the transmission side and a secondary resonator of the reception side. However, there is a limit in sufficiently securing the efficiency of the electromagnetic field coupling between the primary resonator and the secondary resonator. For example, even though the power transmission/reception in the wireless manner is possible, it has not yet become common due to its low efficiency.

Thus, various embodiments of the present disclosure provide for stable wireless power transmission/reception efficiency by using a resonator that is capable of implementing a good electromagnetic field coupling efficiency as a primary resonator on the transmission side.

In addition, various embodiments of the present disclosure provide electronic devices with a resonator that may be easily installed.

According to various embodiments of the present disclosure, an electronic device includes a resonator that is configured to generate induced current by electromagnetic coupling. The resonator includes a first conductor, a plurality of second conductors, one end of each of the second conductors being electrically coupled to a first point of the first conductor, and an other end of each of the second conductors being electrically coupled to a second point of the first conductor, and at least one load, which may comprise reactive component(s), connected with the second conductors in series or in parallel, where a power feeding unit provides power to the second conductors. Thus, the resonator may generate a loop type current that flows in the first and second conductors.

The electronic device described above may be supplied with a charging power as the resonator generates an induced current by an electromagnetic field generated by a primary resonator of a transmission side (e.g., a charging cradle).

The electronic device including the resonator as described above may improve coupling efficiency through the multi-reactive load so that its miniaturization can be facilitated. Accordingly, when applied to a medical device configured to be worn on a user's body (e.g., an electrocardiogram sensor), a wrist watch type electronic device, or an eyeglass type electronic device, the resonator can contribute to the miniaturization of the electronic device while enabling wireless charging. Accordingly, a connector for charging, for example, becomes unnecessary and the electronic device may be configured to efficiently arrange components in an internal space while miniaturizing the electronic device.

BRIEF DESCRIPTION OF THE DRAWINGS

The descriptions above and other aspects, features, and advantages of the present disclosure will be more apparent from the following detailed description taken in conjunction with the accompanying drawings, in which.

DETAILED DESCRIPTION

Figure 1:
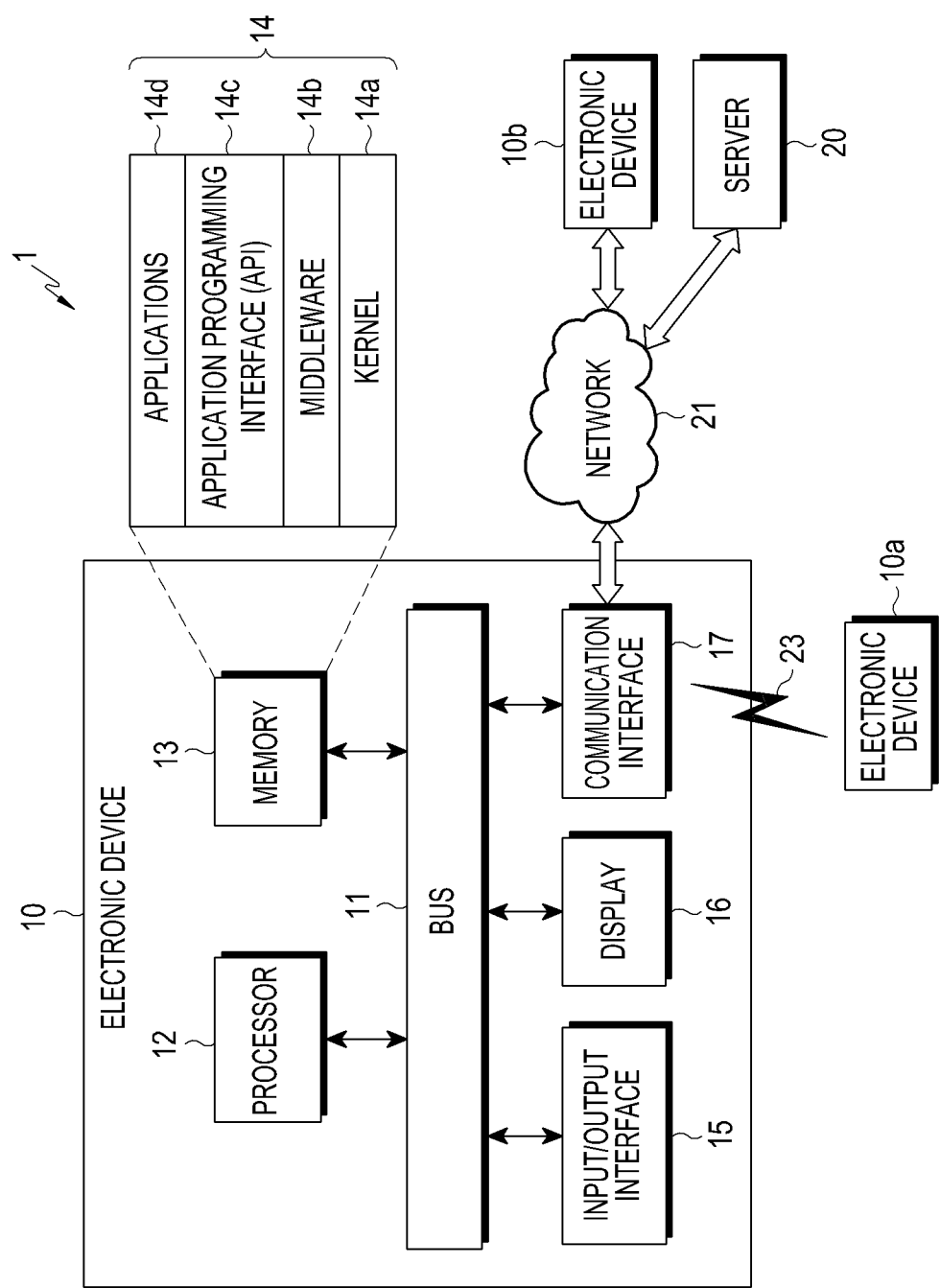
FIG. 1 is a view illustrating a network environment of an electronic device according to various embodiments of the present disclosure.

The present disclosure may describe various embodiments in detail with reference to the accompanying drawings. However, it should be understood that the present disclosure is not limited to the specific embodiments described, but the present disclosure includes all modifications, equivalents, and alternatives within the spirit and the scope of the present disclosure.

Although ordinal terms such as "first" and "second" may be used to describe various elements, these elements are not limited by the terms. The terms are used merely to distinguish one element from other elements. For example, a first element could be termed a second element, and similarly, a second element could be termed a first element without departing from the scope of the present disclosure. As used herein, the term "and/or" includes any and all combinations of one or more associated items.

Further, the relative terms "a front" surface, "a rear" surface, "a top" surface, "a bottom" surface, etc., described with respect to drawings may be replaced by ordinal numbers such as "a first" surface, "a second" surface, etc. Generally, the ordinal numbers such as first and second are used to distinguish different parts and not necessarily importance of a specific part or a specific order.

In the present disclosure, the terms are used to describe specific embodiments, and are not intended to limit the present disclosure. As used herein, the singular forms are intended to include the plural forms as well, unless the context clearly indicates otherwise. In the description, it should be understood that the terms "include" or "have" indicate existence of a feature, a number, a step, an operation, a structural element, parts, or a combination thereof, and do not exclude the existence or probability of addition of one or more other features, numbers, steps, operations, structural elements, parts, or combinations thereof.

Unless defined differently, all terms used herein, which include technical terminologies or scientific terminologies, have the same meaning as that understood by a person skilled in the art to which the present disclosure belongs. Terms defined in a generally used dictionary are to be interpreted to have contextual meanings in the relevant field of art, and are not to be interpreted to have ideal or excessively formal meanings unless clearly defined in that way in the present disclosure.

In the present disclosure, an electronic device may be one of a number of different devices, and the electronic device may be called a terminal, a portable terminal, a mobile terminal, a communication terminal, a portable communication terminal, a portable mobile terminal, a display device, etc.

For example, the electronic device may be a smartphone, a portable phone, a game player, a TV, a display unit, a heads-up display unit for a vehicle, a notebook computer, a laptop computer, a tablet Personal Computer (PC), a Personal Media Player (PMP), a Personal Digital Assistants (PDA), etc. The electronic device may be implemented as a portable communication terminal that has a wireless communication function and a pocket sized. Further, the electronic device may be a flexible device or a flexible display device.

The electronic device may communicate with an external electronic device, such as a server, etc., or perform an operation through an interworking with the external electronic device. For example, the electronic device may transmit an image photographed by a camera and/or position information detected by a sensor unit to the server through a network. The network may be a mobile or cellular communication network, a Local Area Network (LAN), a Wireless Local Area Network (WLAN), a Wide Area Network (WAN), an Internet, a Small Area Network (SAN), etc., but is not limited thereto.

FIG. 1 is a view illustrating a network environment of an electronic device according to various embodiments of the present disclosure. An electronic device 10 within a network environment 1, according to various embodiments, will be described with reference to FIG. 1. The electronic device 10 may include a bus 11, a processor 12, a memory 13, an input/output interface 15, a display 16, and a communication interface 17. In any embodiment, the electronic device 10 may omit at least some of the above components or further include other components.

The bus 11 may include, for example, a circuit for communicatively connecting the processor 12, the memory 13, the input/output interface 15, the display 16, and the communication interface 17 to each other for transfer of, for example, control messages and/or data.

The processor 12 may include one or more of, for example, a Central Processing Unit (CPU), an Application Processor (AP), and a Communication Processor (CP). For example, the processor 12 may carry out operations or data processing related to control and/or communication of at least one other element of the electronic device 10.

The memory 13 may include a volatile memory and/or a non-volatile memory. The memory 13 may store, for example, instructions or data related to at least one other component of the electronic device 10. According to an embodiment, the memory 13 may store software and/or a program 14. The program 14 may include a kernel 14a, middleware 14b, an Application Programming Interface (API) 14c, and/or an application program(s) (or "application(s)") 14d. At least some of the kernel 14a, the middleware 14b, and the API 14c may be referred to as an Operating System (OS).

The kernel 14a may control or manage system resources (for example, the bus 11, the processor 12, or the memory 13) used for executing an operation or function implemented in other programs (for example, the middleware 14b, the API 14c, or the application(s) 14d). Further, the kernel 14a may provide an interface through which the middleware 14b, the API 14c, or the application(s) 14d may access and control or manage individual elements of the electronic device 10.

The middleware 14b may serve as an intermediator that allows the API 14c or the application(s) 14d to communicate with and exchange data with the kernel 14a. Further, in relation to requests for operation received from the application(s) 14d, the middleware 14b may control (e.g., scheduling or load-balancing) the requests by using, for example, a method of determining sequence for using system resources (e.g., the bus 11, the processor 12, the memory 13, etc.) of the electronic device 10 with respect to at least one application among the application(s) 14d.

The API 14c is an interface by which the application(s) 14d control functions provided from the kernel 14a or the middleware 14b, and may include, for example, at least one interface or function (for example, instructions) for file control, window control, image processing, or text control.

The input/output interface 15 may serve as an interface that may transfer instructions or data, which is input from a user or another external device, to another component(s) of the electronic device 10. Further, the input/output interface 15 may output instructions or data received from another component(s) of the electronic device 10 to a user or another external device.

The display 16 may include, for example, a Liquid Crystal Display (LCD), a Light Emitting Diode (LED) display, an Organic Light Emitting Diode (OLED) display, a Micro Electro Mechanical System (MEMS) display, or an electronic paper display. The display 16 may display various types of contents (for example, text, images, videos, icons, or symbols) to users. The display 16 may include a touch screen and receive, for example, a touch input, a gesture input, a proximity input, or a hovering input using an electronic pen or a user's body part.

For example, the communication interface 17 may be used for communicating between the electronic device 10 and an external device (for example, a first external electronic device 10a, a second external electronic device 10b, or a server 20). The communication interface 17 may be connected to a network 21 through wireless or wired communication to communicate with the external device (for example, the external electronic device 10b or the server 20).

The wireless communication may use at least one of, for example, long term evolution (LTE), LTE-advanced (LTE-A), code division multiple access (CDMA), wideband CDMA (WCDMA), universal mobile telecommunication system (UMTS), wireless broadband (WiBro), and global system for mobile telecommunication (GSM) as a communication protocol. The wired communication may include at least one of, for example, a Universal Series Bus (USB), a High Definition Multimedia Interface (HDMI), Recommended Standard 232 (RS-232), and a Plain Old Telephone Service (POTS). The network 21 may include at least one of communication networks such as, for example, a computer network (for example, a LAN or a WAN), the Internet, and a telephone network.

Each of the first and second external electronic devices 10a and 10b may be a device which is the same as or different from the electronic device 10. According to various embodiments of this disclosure, the server 20 may include a group of one or more servers. According to various embodiments of this disclosure, all or some of the operations performed by the electronic device 10 may be performed by another electronic device or a plurality of electronic devices (for example, the first external electronic device 10a, the second external electronic device 10b or the server 20). According to various embodiments of this disclosure, when the electronic device 10 is to perform some functions or services automatically or by request, the electronic device 10 may make a request to another device (for example, the first external electronic device 10a, the second external electronic device 10b or the server 20) to perform at least some of the functions or services instead of performing the functions or services by itself. The other electronic device (for example, the first external electronic device 10a, the second external electronic device 10b or the server 20) may carry out the requested function(s) and transfer the result(s), obtained by carrying out the function(s), to the electronic device 10. The electronic device 10 may provide the requested functions or services based on the received result as it is or after additionally processing the received result. To achieve this, for example, cloud computing, distributed computing, or client-server computing technology may be used.

Various embodiments disclosed herein are provided merely to easily describe technical details of the present disclosure and to help in the understanding of the present disclosure, and are not intended to limit the scope of the present disclosure. Therefore, it should be understood that all modifications and changes or modified and changed forms based on the present disclosure fall within the scope of the present disclosure.

Figure 2:
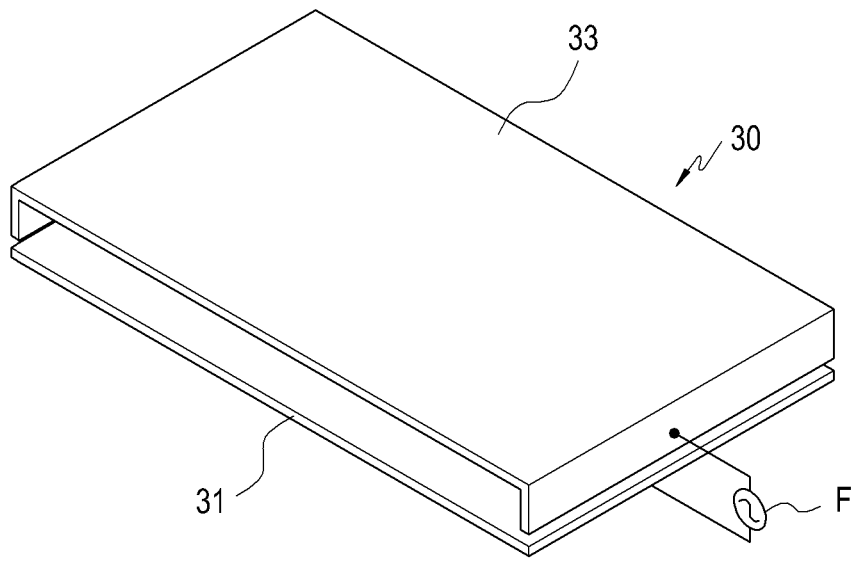
FIG. 2 is a perspective view for describing a resonator of an electronic device according to various embodiments of the present disclosure.
Figure 3:
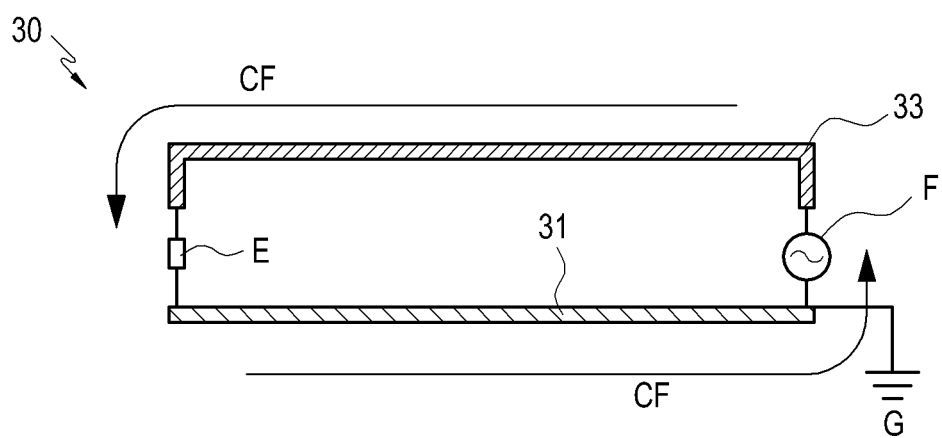
FIG. 3 is a schematic diagram for describing a resonator of an electronic device according to various embodiments of the present disclosure.

FIG. 2 is a perspective view for describing a resonator of an electronic device according to various embodiments of the present disclosure. Referring to FIG. 2, there is shown a resonator 30 of an electronic device according to various embodiments of the present disclosure. FIG. 3 is a schematic diagram for describing a resonator of an electronic device according to various embodiments of the present disclosure. Referring to FIG. 3, there is shown a schematic diagram for describing the resonator 30 according to various embodiments of the present disclosure.

The resonator 30 of the electronic device may include a first conductor 31, at least one second conductor 33 of which one end is electrically coupled to a first point of the first conductor 31 and an other end is electrically coupled to a second point of the first conductor 31, and a load E is connected between the first conductor 31 and the second conductor 33 in series or in parallel. The resonator 30 may generate an induced current by being positioned within an electromagnetic field, may supply a direct current (DC) by use of a rectifier etc., and may perform wireless electromagnetic wave or power transmission/reception by including a power feeding unit F.

Referring to FIGS. 2 and 3, the first conductor 31 may be made of a flat plate of a conductive material that acts as a ground for the resonator 30. The second conductor 33 may be made of a flat plate of a conductive material and arranged to face the first conductor 31. Each end of the second conductor 33 may be bent toward the first conductor 31 to facilitate electric coupling with the first conductor 31. For example, the second conductor 33 may be connected with the first conductor 31 directly, or through capacitive coupling, inductive coupling, resistive coupling, etc. Accordingly, the load E may also be referred to as impedance E.

The load E may be connected with the second conductor 33 in series or in parallel so as to improve the electromagnetic field coupling characteristic of the resonator 30. The load E may include, for example, a capacitive load or an inductive load. For example, in forming the electric coupling of the first conductor 31 and the second conductor 33, the load E may be arranged between the first conductor 31 and the second conductor 33 in series. As will be described in more detail below, the load E may be not only connected with the second conductor 33 in series or in parallel, but also connected with the power feeding unit F in series or in parallel.

Through the arrangement structure of the first conductor 31 and the second conductor 33 and the load E as described above, the resonator 30 may generate an induced current. For example, the resonator, the first conductor 31 and the second conductor 33, and the load E may resonate by peripheral electromagnetism so as to generate an induced current. The induced current generated by the resonator 30 may be converted into a DC current through a rectifier or the like, and the converted DC current may be output at the appropriate voltage through a DC converter (DC-to-DC converter) to be used for charging an electronic device. A configuration for supplying the charging power of the electronic device using the power generated through the resonator 30 or the like will be described in more detail with reference to FIG. 20. When the resonator 30 is positioned within an electromagnetic field (e.g., an electromagnetic field generated by a primary resonator of the transmission side of a charging cradle or the like), an induced current CF may be induced on the surfaces of the first conductor 31 and the second conductor 33. Depending on the arrangement of the first conductor 31 and the second conductor 33, the induced current CF may be formed as a loop type current as illustrated in FIG. 3.

According to various embodiments of the disclosure, the resonator 30 may further include a power feeding unit F in addition to the first conductor 31 and the second conductor 33 and the load E described above. The power feeding unit F may be connected with the second conductor 33 in series, and may be connected with the first conductor 31 or a separate ground. By including the power feeding unit F, the resonator 30 may be utilized as a radiator for transmitting a wireless electromagnetic wave or power. For example, the resonator 30 may further include the power feeding unit F or may be connected to the power feeding unit F so as to form an antenna device or a radiator for transmitting wireless power. By including an impedance matching circuit, the power feeding unit F may improve electric coupling efficiency when the resonator 30 is used as a transmission side primary resonator.

FIGS. 4 to 7 are views illustrating examples of implementing a resonator, for example, the resonator 30, of an electronic device according to various embodiments of the present disclosure.

Some of the following specific embodiments will exemplify configurations in which the resonator 30 includes the power feeding unit F. However, the power feeding unit F does not necessarily have to be included in the resonator 30. For example, the power feeding unit F may be configured separately from the resonator 30, and may be replaced by a rectifier or the like. The resonator 30 may transmit or receive a wireless electromagnetic wave (or power) depending on whether it is connected with the power feeding unit or the rectifier.

Referring to FIGS. 4 to 7, for the resonator 30, the arrangement of the first conductor 31 and the second conductor 33, the load E, and the power feeding unit F may be diversely implemented. For example, the load E may be implemented as a capacitive load C or an inductive load L, and may be connected with the first conductor 31 and the second conductor 33 in series. In addition, the load E may be connected with the second conductor 33 or the power feeding unit F in series or in parallel. The first conductor 31 may provide a ground G in the structure of the resonator 30. According to various embodiments, the first conductor 31 may be utilized as a conductor that provides a flow path of an induced current without being limited to providing the ground G. In the illustrated embodiments, a structure, in which the load E is implemented by one of a capacitive load C and an inductive load L, is exemplified. However, the load E may be formed by a combination of the capacitive load C and the inductive load L. The capacitive load C and the inductive load L may be connected with each other in series or in parallel, and may be connected with the power feeding unit F in parallel. According to various embodiments, the load E may further include a resistive load. Accordingly, the load E may also be referred to as impedance E.

Figure 4:
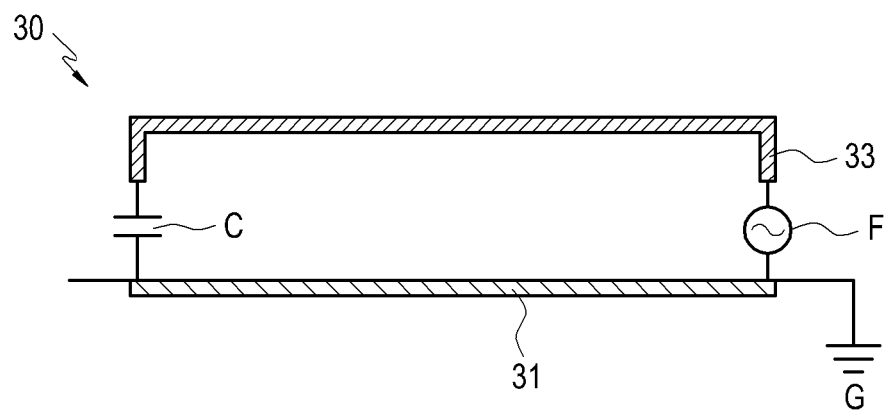
FIGS. 4 to 7 are views illustrating examples of implementing a resonator of an electronic device according to various embodiments of the present disclosure.
Figure 5:
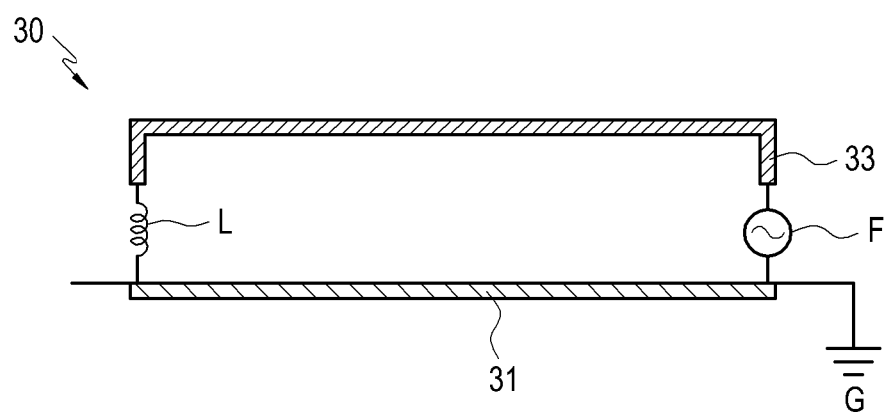

Referring to FIGS. 4 and 5, the load E may be the capacitive load C or the inductive load L, and may be connected in series between the first conductor 31 and the second conductor 33. The load E may adjust the resonance frequency of the resonator 30 and may improve an electromagnetic field coupling characteristic by, for example, adjusting the capacitive load C or the inductive load L.

Figure 6:
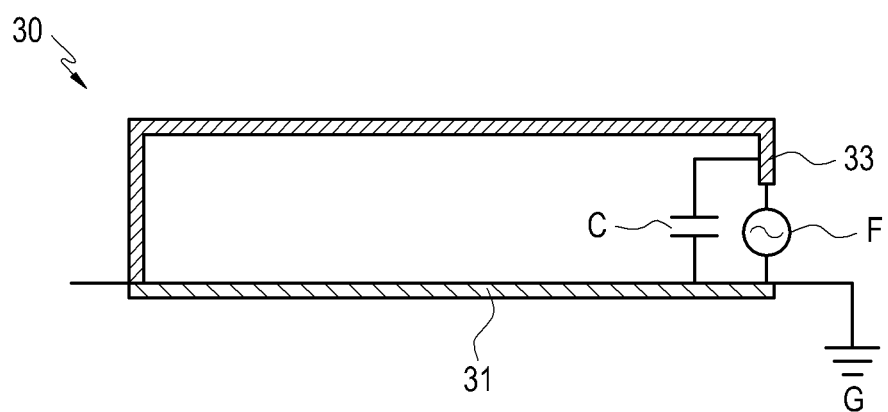
Figure 7:
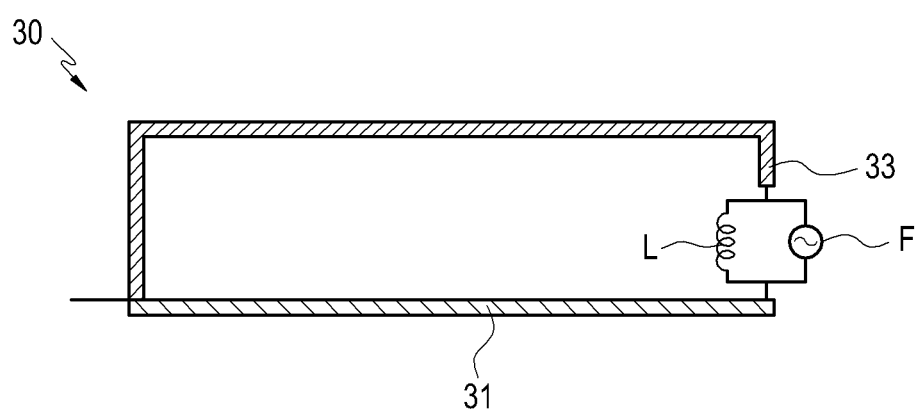

Referring to FIGS. 6 and 7, the load E may be implemented by a capacitive load C or an inductive load L connected in parallel with the power feeding unit F. As illustrated in FIG. 7, when connected with the power feeding unit F in parallel, the load E (e.g., the inductive load L) may be connected between the first conductor 31 and the second conductor 33. As described above, the first conductor 31 may be utilized as a conductor that provides a ground or a flow path of an induced current. For example, as in the embodiment illustrated in FIG. 7, in implementing the resonator 30, the first conductor 31 may provide the flow path of the induced current.

In the above-described embodiment, it has been exemplarily described that each of the first conductor 31 and the second conductor 33 has a flat shape. However, the present disclosure is not limited thereto. For example, the first conductor 31 and the second conductor 33 may have a wire shape by being composed of a printed circuit pattern formed on a dielectric substrate. In addition, depending on the position and the space where the resonator 30 is disposed, the first conductor 31 and the second conductor 33 may have a non-linear line form. In addition, as will be described below, the first conductor 31 and the second conductor 33 may be provided in different shapes so that the resonator 30 may have an asymmetric structure. For example, according to various embodiments of the present disclosure, the resonator 30 of the electronic device is not limited to the shapes of the first conductor 31 and the second conductor 33. The first conductor 31 and the second conductor 33, or the combination of the first conductor 31 and the second conductor 33 and the load E, may generate an induced current when the resonator 30 is positioned within an electromagnetic field, and the combination of the first conductor 31 and the second conductor 33 and the power feeding unit F may form a radiator for transmitting a wireless electromagnetic wave (or power).

The current flowing on the surfaces of the first conductor 31 and the second conductor 33 may follow the shortest path that connects the power feeding unit F (or a rectifier) and the load E with each other. When the resonator 30 includes one or more (e.g., two) loads, a plurality of power feeding units F (or rectifiers) may be provided. In some embodiments, a plurality of paths may be provided that extend from one power feeding unit (or rectifier) to the first conductor 31 and the second conductor 33. Even in the case where a plurality of power feeding units (or rectifiers) and loads are provided, current may flow along the shortest path extending between each of the power feeding units (or rectifiers) and the load. In the case where the resonator 30 is connected with a rectifier, a surface current may be generated by the resonator 30 when the resonator is positioned in the electromagnetic field formed by the primary resonator of the transmission unit side, and as the amount of the surface current generated on the resonator 30 (e.g., on the second conductor 33) increases, the coupling efficiency between the primary resonator and the resonator 30 may be improved.

Figure 8:
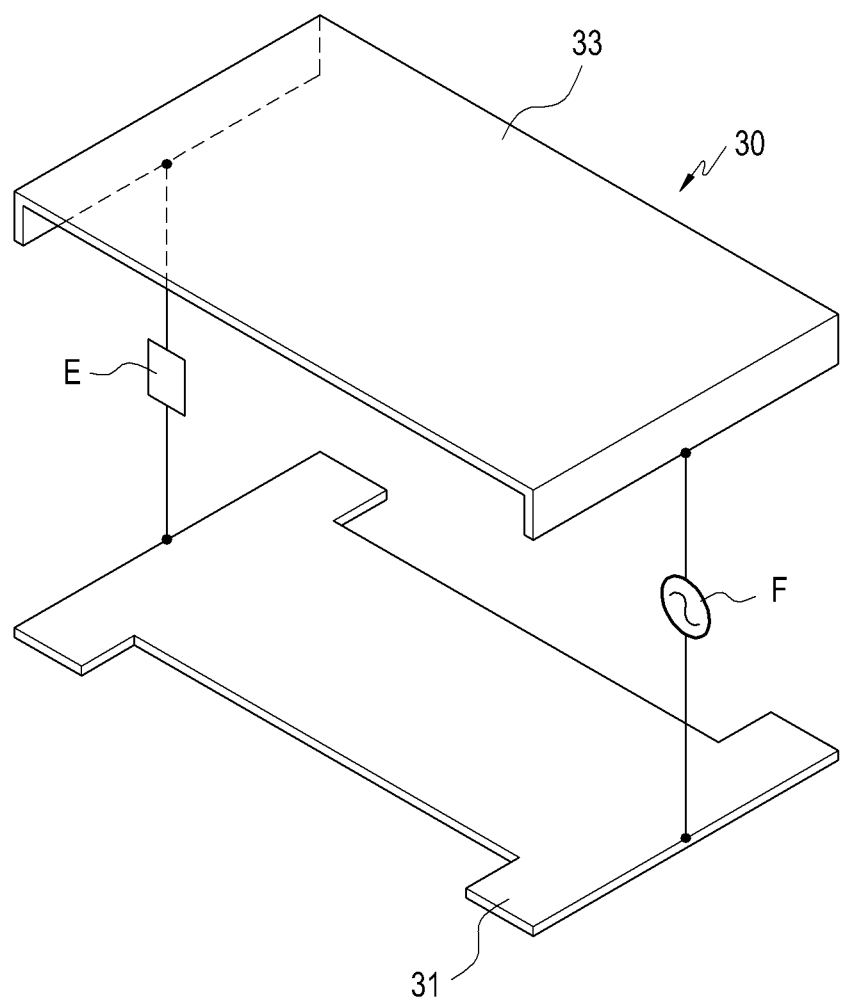
FIG. 8 is a perspective view for describing another example of a resonator of an electronic device according to the various embodiments of the present disclosure.

FIG. 8 is a perspective view for describing another example of a resonator of an electronic device according to the various embodiments of the present disclosure.

Referring to FIG. 8, as the first conductor 31 and the second conductor 33 have different shapes, the resonator 30 may be formed with an asymmetric shape. According to electromagnetic field image theory, an asymmetric resonator may exhibit a performance similar to that of a resonator having a resonator that is larger than its practical size. For example, an asymmetric resonator may have an electromagnetic field coupling efficiency that is better than that of a symmetric resonator having the same size.

Figure 9:
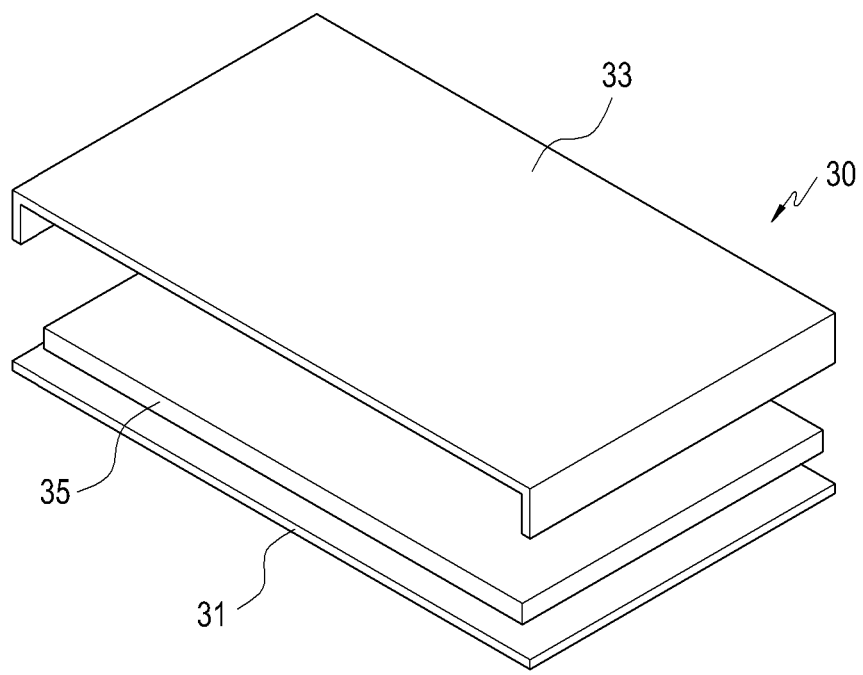
FIG. 9 is a perspective view for describing another example of a resonator of an electronic device according to various embodiments of the present disclosure.
Figure 10:
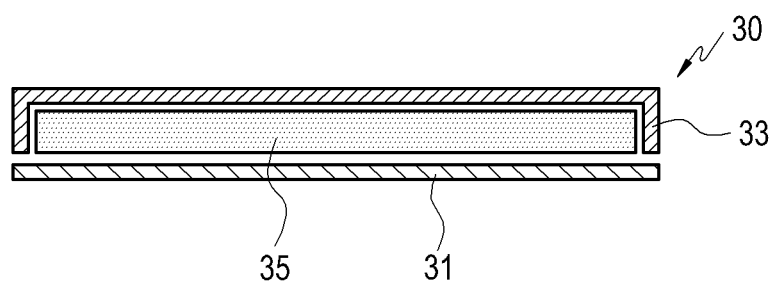
FIG. 10 is a schematic diagram for describing another example of a resonator of an electronic device according to various embodiments of the present disclosure.

FIG. 9 is a perspective view for describing another example of the resonator 30 of an electronic device according to various embodiments of the present disclosure. FIG. 10 is a schematic diagram for describing another example of the resonator 30 of an electronic device according to various embodiments of the present disclosure.

According to various embodiments of the disclosure, the resonator 30 may include a magnetic material (or a dielectric material) disposed between the first and second conductors or around the first and second conductors. The magnetic material (or dielectric material) may improve the quality factor of the resonator, and as the quality factor of the resonator is improved, the electromagnetic field coupling efficiency with the primary resonator may be improved.

Referring to FIGS. 9 and 10, the resonator 30 of the electronic device of the present embodiment may further include a magnetic material 35 (e.g., a ferrite member) disposed between the first conductor 31 and the second conductor 33. As described above, the magnetic material 35 (or dielectric material) between or around the first conductor 31 and the second conductor 33, the quality factor of the resonator 30 may be improved, and a coupling efficiency with another resonator may be improved. This is because the direction of the electromagnetic field formed by the resonator 30 may be adjusted by the magnetic material 35. Using such property of the magnetic material, the distribution of the electromagnetic field formed around the resonator 30 or around the electronic device equipped with the resonator 30 may be set according to the arrangement of the resonator 30. Similarly to the preceding embodiments, the resonator 30 may include a reactive load, for which various configurations have been discussed above through the preceding embodiments and thus descriptions thereof will be omitted in the detailed description of the present embodiment.

Figure 11:
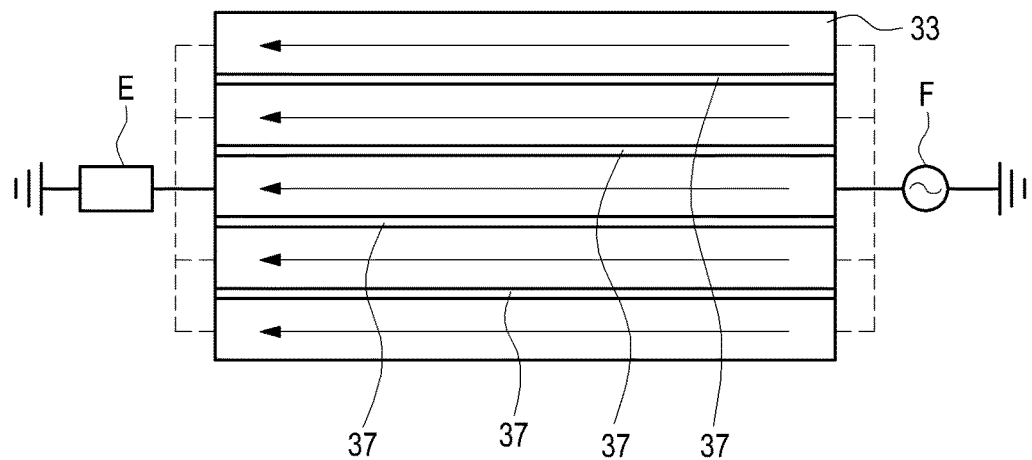
FIG. 11 is a schematic diagram for describing still another example of a resonator of an electronic device according to various embodiments of the present disclosure.

FIG. 11 is a schematic diagram for describing still another example of a resonator of an electronic device according to various embodiments of the present disclosure.

According to various embodiments of the present disclosure, the coupling efficiency with another resonator for electromagnetic field coupling may be improved by widening the surface area in which the current flows on the first and/or second conductors. For example, as illustrated in FIG. 11, by forming a plurality of slits 37 in the second conductor 33, a plurality of paths in which the current may flow through the second conductor 33 may be physically formed such that each path is formed between every two adjacent slits 37. For example, in a second conductor having a non-slit structure, the current flows through one path, but in the second conductor 33 having the structure illustrated in FIG. 11, the current may flow through five paths with a greater total surface area than through the one path with no slits.

In the structure illustrated in FIG. 11, while one end of the second conductor 33 may be connected with the first conductor (not illustrated) through a power feeding unit F, the other end of the second conductor 33 may be connected with the first conductor through a load E. According to various embodiments of the disclosure, one end of the second conductor 33 may be directly connected with the first conductor, and the power feeding unit F (or the rectifier) or the load E may be connected to the other end of the second conductor 33. While FIG. 11 illustrates a configuration in which the power feeding unit F and the load E are connected to different locations, the power feeding unit F of the load E is connected to only one location, a plurality of power feeding units F may be provided in any one end of the second conductor 33, and a plurality of loads E may be connected with the second conductor 33 in series or in parallel as in the preceding embodiments. For example, the number of loads E may correspond to the number of current flow paths on the second conductor 33. According to various embodiments of the disclosure, each of the power feeding units F and the loads E may be connected to one point of the second conductor 33 in series. In this case, the power feeding units F and the loads E may be connected with each other in parallel. In addition, similarly to the preceding embodiments, the resonator 30 including the second conductor 33 of the present embodiment may also be formed in an asymmetric shape, and may include a magnetic material or a dielectric material, and the power feeding unit F may include an impedance matching circuit. In implementing the resonator 30 with a multiple load structure as described above, a loop type current may flow via the first and second conductors.

It can be said that the resonator 30 of the above-described embodiments are based on a structure in which the first conductor 31 and the second conductor 33 are disposed in different planes. For example, the resonator 30 may have a structure in which the first conductor 31 and the second conductor 33 are in different layers of a multi-layered circuit board, or a structure in which one of the first conductor 31 and the second conductor 33 is formed of a conductive member on an outer surface of the electronic device and the other is inside the electronic device. According to various embodiments of the disclosure, the resonators described above may be implemented in a planar shape.

Figure 12:
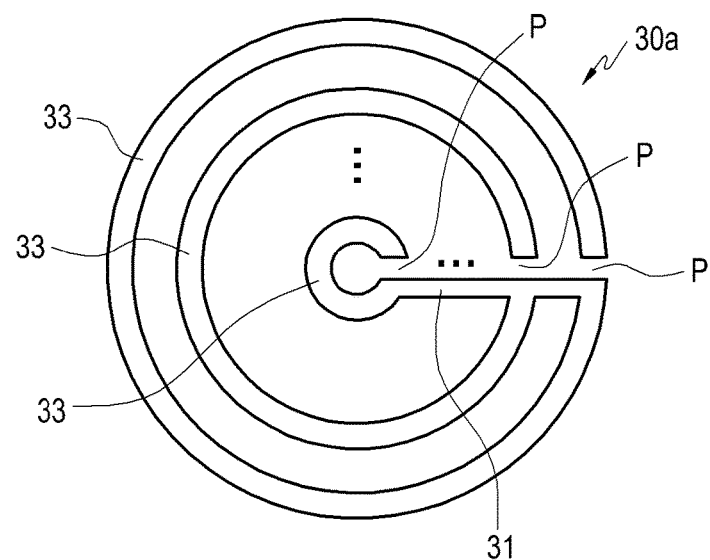
FIGS. 12 to 14 are views illustrating examples, in which a resonator of an electronic device according to various embodiments is implemented in a plane shape.
Figure 13:
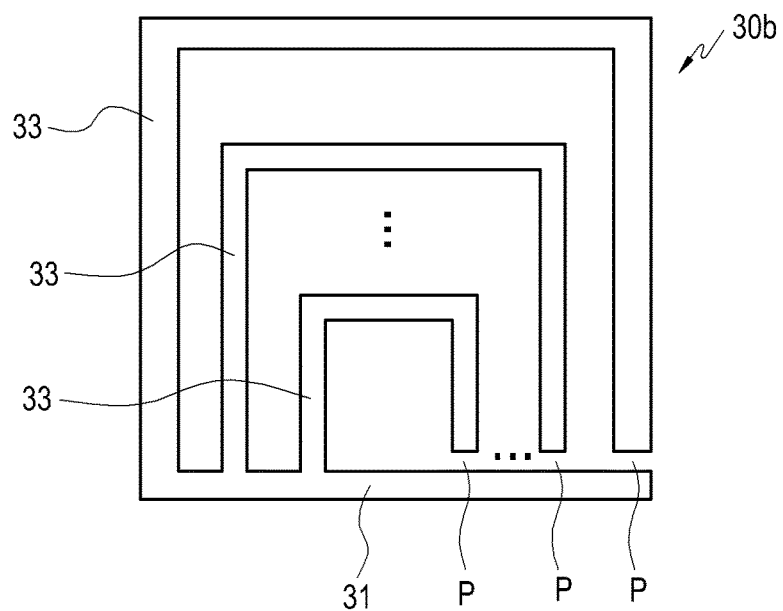
Figure 14:
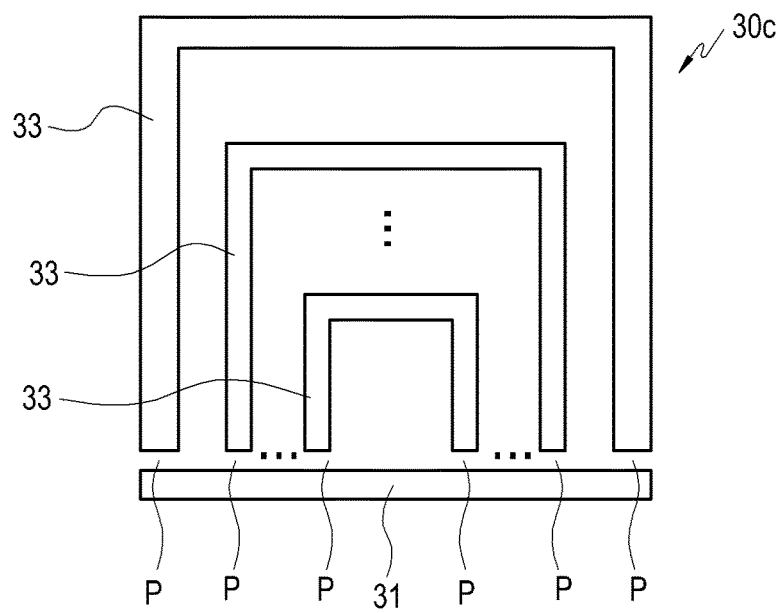

FIGS. 12 to 14 are views illustrating examples in which a resonator of an electronic device according to various embodiments of the disclosure is implemented in a plane shape.

Referring to FIGS. 12 to 14, the resonators 30a, 30b, and 30c of the electronic device according to various embodiments of the present disclosure may be implemented in a plane. Each of the illustrated resonators 30a, 30b, and 30c includes a first conductor 31 and a plurality of second conductors 33. The second conductors 33 may extend in parallel to each other in the forms branched from the first conductor 31 at different first points. The ends of the second conductors 33 may be adjacent to different second points on the first conductor 31, respectively. For example, each of the resonators 30*a*, 30*b*, and 30*c* may have a multiple loop shape formed by the second conductors 33. Here, the description, "the second conductors are branched from the first conductors," may cover not only the structure in which the second conductors 33 are physically and directly connected with the first conductor 31, but also a structure in which each of the opposite ends of the second conductors 33 is positioned adjacent to the first conductor 31 as illustrated in FIG. 14. For example, even if each of the opposite ends of the second conductors 33 is positioned adjacent to the first conductor 31 rather than being physically directly connected to the first conductor 31, such a structure may be referred to as a "branched structure" in an embodiment of the present disclosure.

Power feeding units and loads for each of the resonators 30*a*, 30*b*, and 30*c* may be between the first conductor 31 and the ends of each second conductors 33 (e.g., at the points indicated by "P"). As described above, the load may be formed of capacitive load, inductive load, or a combination of capacitive load and inductive load, and in the configuration of the load formed of a combination of capacitive load and inductive load, the capacitive load and the inductive load may be connected with each other in series or in parallel. According to various embodiments, the load described above may further include a resistive load and, therefore, the load may be referred to as impedance.

By arranging the second conductors 33 in a multiple loop shape, each of the resonators 30*a*, 30*b*, and 30*c* may generate a plurality of loop-shaped current flows and the current may flow through the second conductors 33. Thus, it is possible to obtain a large current flowing area on the resonators 30*a*, 30*b*, and 30*c*. The operating characteristics of each of the resonators 30*a*, 30*b*, and 30*c* may depend on the spacing between the second conductors 33, the resonance frequency, the shape, the length, and the area of the second conductors 33, spacing between the first conductor 31 and the second conductor 33, characteristic values of the reactive load (e.g., a capacitance value or an inductance value), and the magnetic material (or dielectric material) disposed between or around the first conductor 31 and the second conductor 33.

Figure 15:
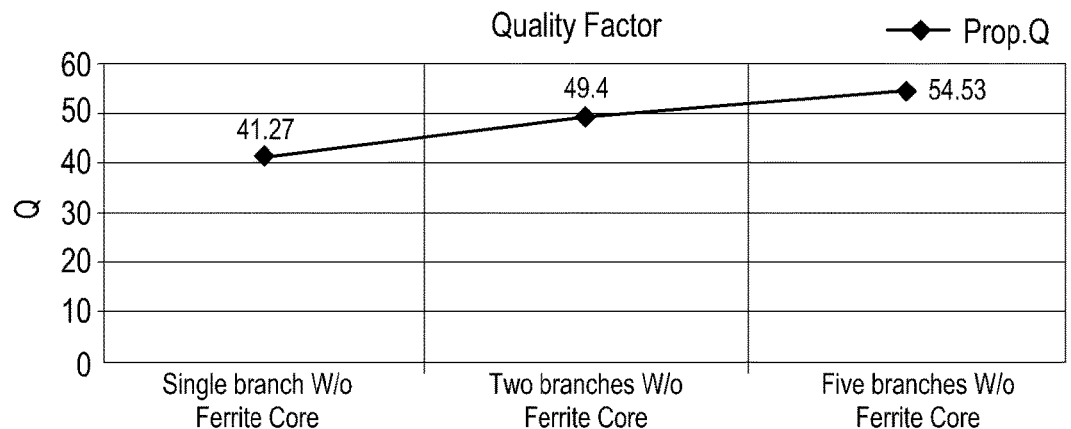
FIG. 15 is a graph representing quality factors measured for a resonator of an electronic device according to various embodiments of the present disclosure.

FIG. 15 is a graph representing quality factors measured for a resonator of an electronic device according to various embodiments of the present disclosure.

The measured values of the graph illustrated in FIG. 15 represent the results that were obtained by measuring the quality factors of the resonators formed with the same size but with one, three, and five second conductors. As illustrated in FIG. 15, it will be appreciated that when only one conductor is used, the quality factor indicates 41.27, and with multiple loads configured with, for example, five second conductors, the quality factor indicates 54.53, so that the quality factor increases approximately in proportion to the number of conductors.

Figure 16:
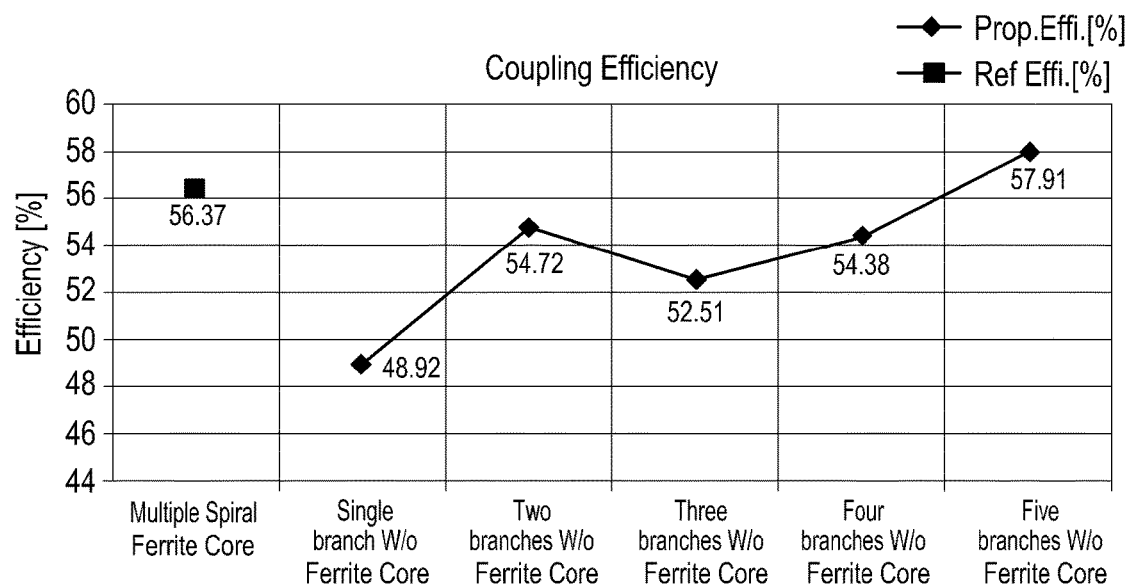
FIG. 16 is a graph representing coupling efficiencies obtained by measuring transmission/reception resonators of electronic devices according to various embodiments of the present disclosure.

FIG. 16 is a graph represents coupling efficiencies obtained by measuring transmission/reception resonators of an electronic device according to various embodiments of the present disclosure.

In order to compare coupling efficiencies with resonators which are to form an electromagnetic field coupling, each of the coupling efficiencies of a conventional resonator and the resonators according to the embodiments of the present disclosure with respect to a transmission side resonator was measured and indicated on the graph of FIG. 16. Here, a conventional resonator where a coil is wound nine times on a ferrite core was compared to various resonator embodiments according to the present disclosure, where the embodiments did not have a ferrite core. In performing the measurement, the relative positions of the transmission side resonator and the reception side resonators were set to a position where the coupling efficiency became the maximum. As will be appreciated, the conventional resonator exhibits a coupling efficiency of 56.37% with the transmission side resonator, and among the embodiments of the present disclosure, the resonator using five second conductors exhibits the coupling efficiency of 57.91%, thereby providing an improvement as compared to the conventional resonator. In addition, the conventional resonator wound with the coil is considerably more expensive to manufacture and occupies a larger installation space. Accordingly, it can be seen that resonators according to various embodiments of the present disclosure may be simpler in structure, and may provide better coupling efficiency, even with the same or smaller size.

Figure 17:
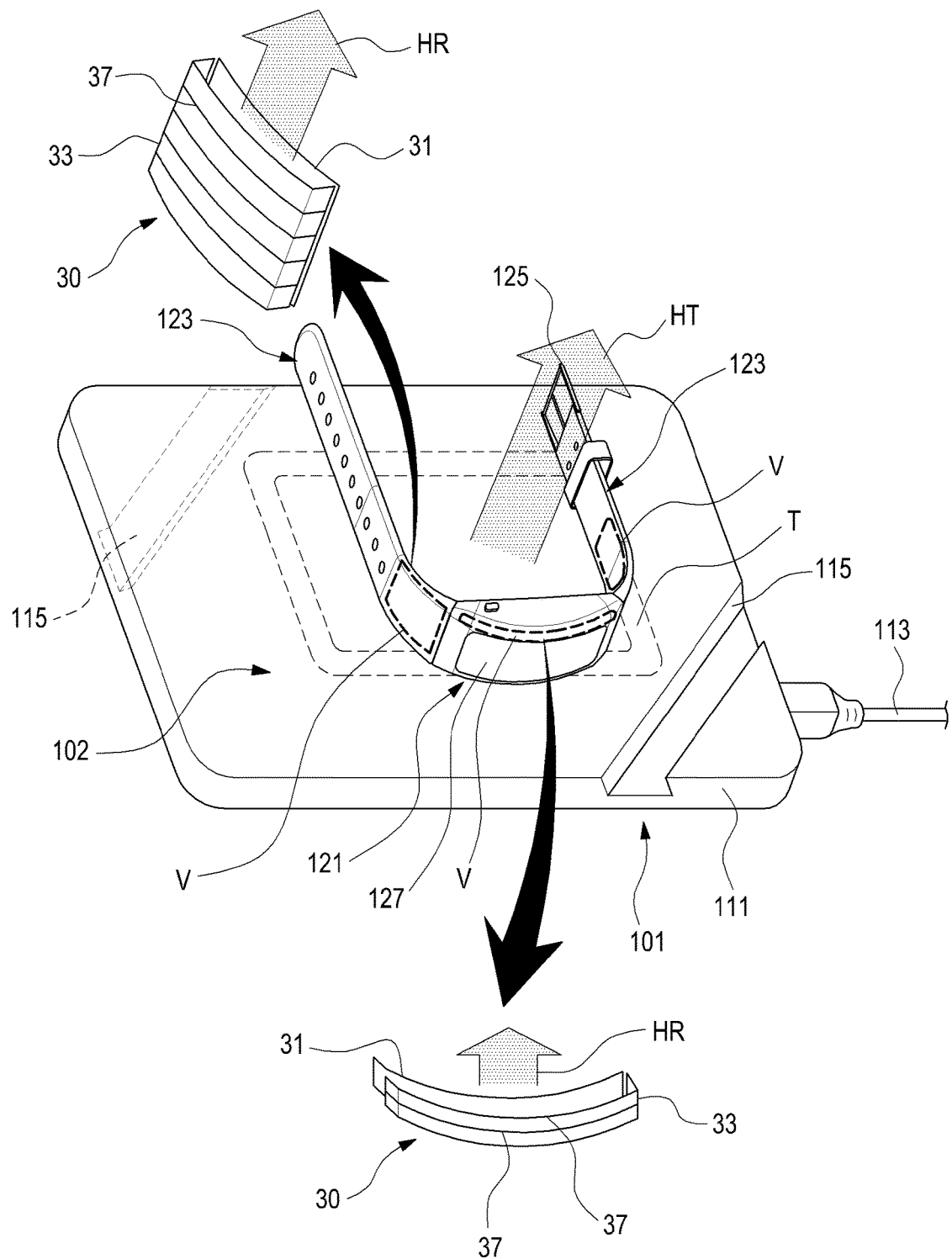
FIG. 17 is a view illustrating an electronic device according to one of various embodiments of the present disclosure in a state of being charged.
Figure 18:
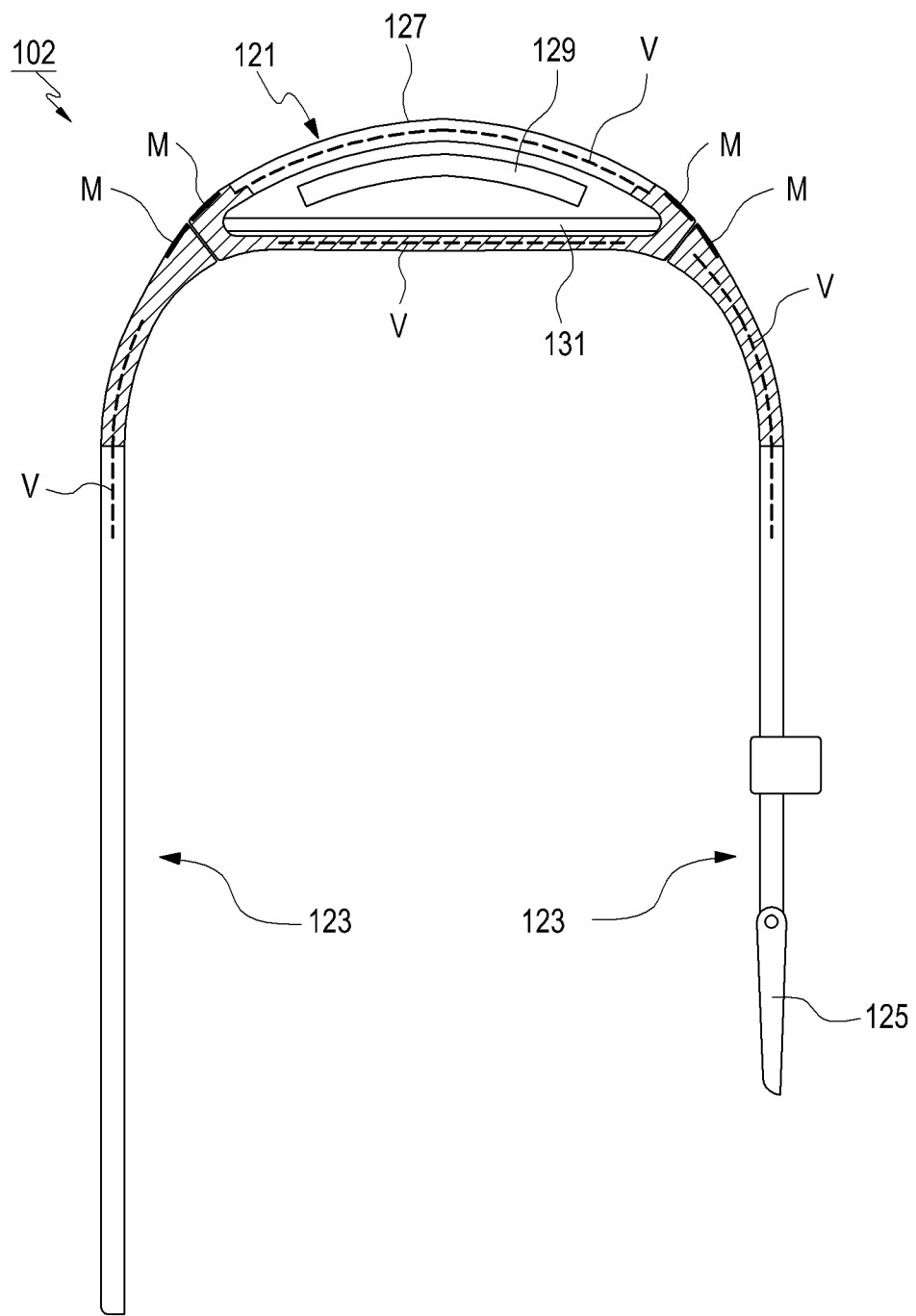
FIG. 18 is a sectional view illustrating the electronic device of FIG. 17 according to one of various embodiments of the present disclosure.

FIG. 17 is a view illustrating an electronic device according to one of various embodiments of the present disclosure in a state of being charged. FIG. 18 is a sectional view illustrating the electronic device of FIG. 17 according to one of various embodiments of the present disclosure.

In the following detailed description, as an example, a wearable electronic device will be described as the electronic device according to various embodiments of the present disclosure. However, the present disclosure is not necessarily limited to this. For example, the present disclosure may also be applied to an electronic device to which an Internet of Things (IOT) technology is applied so that power may be transmitted/received between different electronic devices in a wireless manner.

Referring to FIGS. 17 and 18, the electronic device 102 (label shown in FIG. 18) is a wearable (e.g., wrist-wearable) electronic device which may include wearing parts that extend out from opposite sides of the main body 121, such as, for example, straps 123. The straps 123 may fasten to each other by a buckle 125 so as to allow a main body 121 to be worn on a user's body, for example, a wrist. On the front surface of the main body 121, a display device 127 may be mounted, and a circuit board 131 may be disposed inside the main body 121. The electronic device 102 may be provided with at least one of the above-disclosed resonators 30, 30*a*, 30*b*, and 30*c*. In describing the present embodiment, the resonator provided in the electronic device 102 will be denoted by reference number "30".

On the electronic device 102, the resonator 30 may be embedded in the front surface or the rear surface of the main body 121 or in the straps 123. The resonator 30 for wireless power transmission/reception may be disposed at any one of the positions indicated by "V" in FIGS. 17 and 18. In addition, when any one of the main body 121 and the straps 123 includes a conductive member M (shown in FIG. 18) such as, for example, metal for exterior ornamentation or the like, at least a part of the conductive member M may form a part of the above-described resonator 30 such as, for example, the first conductor 31 or the second conductor 33.

The electronic device 102 may be supplied with a charging power by being placed on a wireless power transmission unit such as, for example, a charging cradle 101. The charging cradle 101 may include, for example, a primary resonator T that generates an electromagnetic field, and power to the charging cradle 101 may be provided via a cable 113. FIG. 17 exemplifies an electromagnetic field formed by the primary resonator T, the electromagnetic field being denoted by reference numeral "HT". When the electronic device 102 is placed on the charging cradle 101 (for example, when the electronic device 102 is positioned within the electromagnetic field HT formed by the charging cradle 101), the resonator 30, a part of the electronic device 102, forms an electromagnetic field coupling with the resonator T of the charging cradle 101 so as to generate an induced current so that the battery 129 (FIG. 18) embedded in the electronic device 102 can be charged. In the present embodiment, the resonator 30 generates the induced current by being positioned within the electromagnetic field formed by the primary resonator T, and may include or may be connected to a rectifier rather than the above-described power feeding unit F. A configuration in which the resonator 30 is connected to the rectifier is described in more detail with reference to FIG. 20.

The resonator 30 may include a second conductor 33 and a plurality of slits 37 formed on the second conductor 33. As the number of the slits 37 increases, more current flowing paths may be formed on the second conductor 33, and as the current flowing paths increase, the quality factor or the like of the resonator 30 may be improved. When the quality factor or the like of the resonator 30 is improved, a coupling efficiency (e.g., an electromagnetic field coupling efficiency between the resonator 30 and other resonators (e.g., the primary resonator T)) may be improved. When a part of the main body 121 or a part of the straps 123 is formed as a conductive member M, a part of the conductive member M may be utilized as the second conductor 33 or the first conductor 31.

When positioned within the electromagnetic field HT of the primary resonator T, the resonator 30 may induce current along the extending direction of the slits 37. For example, the resonator 30 may be excited by the electromagnetic field HT of the primary resonator T to generate the induced current. When the electronic device 102 is mounted on the charging cradle 101, the electromagnetic field HT of the primary resonator T may excite the resonator 30. At this time, when the current flowing path(s) formed on the resonator 30 is (are) arranged in a direction perpendicular to the electromagnetic field HT of the primary resonator, the maximum electromagnetic field coupling efficiency can be secured between the primary resonator T and the resonator 30. For example, when an electromagnetic field HR, which is formed by the resonator 30, is parallel to the electromagnetic field HT formed by the primary resonator T. Even if the two electromagnetic fields HT and HR are not parallel to each other, it is possible to secure a good coupling efficiency between the primary resonator T and the resonator 30 so that at least some of the vector components of the electromagnetic field HR formed by the resonator 30 are parallel to the electromagnetic field HT of the primary resonator T. Accordingly, good wireless power transmission/reception is enabled between the charging cradle 101 and the electronic device 102. As described above, the resonator according to various embodiments of the present disclosure may sufficiently secure the wireless power transmission/reception efficiency by being properly arranged according to the placement direction of the electronic device or the direction of the electromagnetic field formed by the primary resonator of the charging cradle.

The resonator 30 may be disposed at one or more of the points indicated by "V" in FIGS. 17 and 18, and may also be disposed at any other point on the electronic device 102. The number, positions, etc., of the resonators 30 disposed on the electronic device 102 may vary in consideration of the wireless power transmission/reception efficiency, the shape, the placement state, etc., of the electronic device 102.

The charging cradle 101 may have a top surface that is flat so that any type of electronic device equipped with a resonator capable of receiving wireless power can be placed thereon. Accordingly, electronic devices of different shapes may be supplied with wireless power for charging by the charging cradle 101 when the electronic devices have the resonator 30. According to various embodiments of the disclosure, the charging cradle 101 may include a mounting recess 115 formed at a proper position thereon. Although only one mounting recess 115 is shown, various embodiments of the disclosure may have a plurality of mounting recesses. An electronic device capable of receiving wireless power may be laid on the top surface of the charging cradle 101 or mounted in the mounting recess 115 so as to be supplied with power from the charging cradle 101 in a wireless manner.

Figure 19:
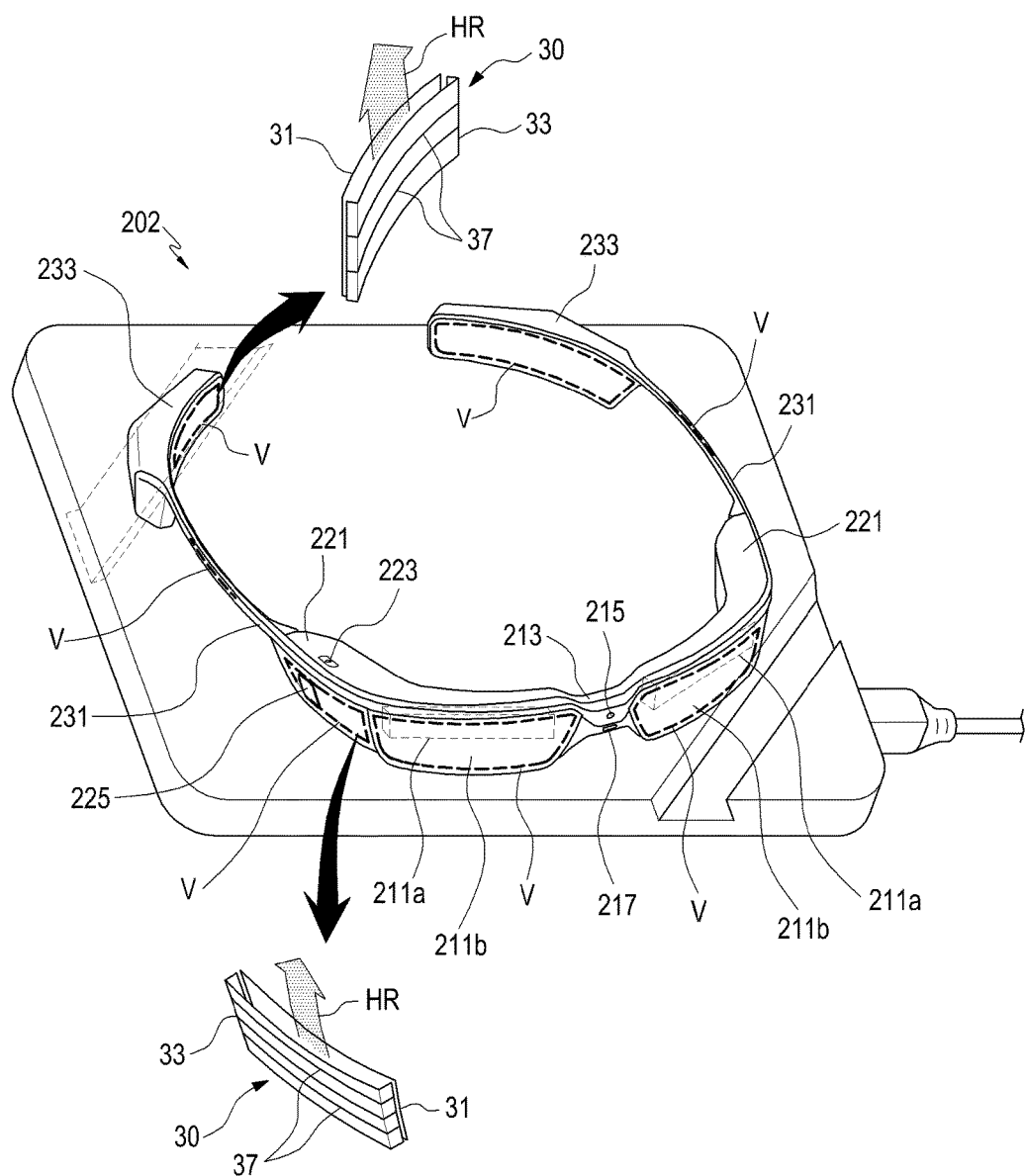
FIG. 19 is a perspective view illustrating an electronic device according to one of various embodiments of the present disclosure.

FIG. 19 is a perspective view illustrating an electronic device according to another one of various embodiments of the present disclosure.

Referring to FIG. 19, the electronic device 202 may be supplied with charging power through the charging cradle 101 so as to charge the battery embedded therein. For example, at least one of the resonators 30, 30a, 30b, and 30c of the embodiments described above may be mounted at one of the points indicated by alphabet "V". In describing the present embodiment, the resonator provided in the electronic device 202 will be denoted by reference number "30".

The electronic device 202 may be implemented as a display device which is wearable on a user's body such as head or face. A see-through display unit may be positioned in a region adjacent to the user's head (e.g., eyes) and a speaker (not illustrated) may be positioned in a region adjacent to the user's ears so as to provide visual information and auditory information, respectively. The electronic device 202 may be, for example, an eyeglass type display device or a helmet type display device. The electronic device 202 may include a monocular type display device 211a including one display unit 211a that displays contents meant to be viewed by one eye. As an alternative, the electronic device 202 may include a binocular type display device including two display units 211a with a display unit 211a for each eye. The binocular type display device may be able to display a three-dimensional image. The illustrated electronic device 202 is a configuration having a binocular type display device but may selectively operate only one of the plurality of display units 211a.

The electronic device 202 may include optical lenses 211b, first housings 221 that partially accommodate the optical lenses 211b, second housings 233 that accommodate battery packs, and housing connection portions 231 that interconnect the first housings 221 and the second housings 233. For example, the electronic device 202 may be configured to be in bilateral symmetry. The display unit(s) 211a may project an image, either directly or indirectly, on the optical lenses 211b. The housing connection portions 231 may be made of an elastically flexible material, and may allow the electronic device 202 to be worn on the user's head or face. The electronic device 202 may include a bridge 213 that interconnects the first housings 221. The optical lenses 211b, the first housings 221, the display units 211a, etc., may be utilized as a main body of the electronic device 202, the housing connection portions 231, the second housings 233, etc., may be utilized as wearing parts (e.g., temples) that enable the main body to be worn on the user's body (e.g., head or face) while accommodating some electronic components of the electronic device 202. When the electronic device 202 is worn on the user's face, the wearing parts may be seated on the user's ears.

The electronic device 202 may include a camera unit 215 and a sensor unit 217. The camera unit 215 may be positioned in at least one of the first housings 221. For example, the camera unit 215 may be positioned in one of the first housing 221 or each of the first housings 221. In addition, the camera unit 215 may be positioned in the bridge 213.

The sensor unit 217 may be positioned in at least one of the first housings 221. For example, the sensor unit 217 may be positioned in one of the first housings 221 or each of the first housings 221. In addition, the sensor unit 217 may be positioned in the bridge 213.

The first housings 221 of the electronic device 202 may include at least one of a button 223 and a touch pad 225 as an input device. In addition, although not illustrated, the electronic device 202 may include a microphone or a speaker for inputting/outputting a sound.

The resonator 30 may be disposed in at least one of the optical lenses 211b, the first housings 221, the second housings 233, and the housing connecting portions 231, for example, at one or more the positions indicated by "V". When batteries are disposed in the second housings 233, respectively, the resonator for wireless power reception may be disposed in each of the second housings 233.

The resonator 30 may be composed of first conductor 31 and the second conductor 33 which are disposed to face each other. The second conductor 33 may include slits 37 extending along, for example, an extending direction of the housing connecting portions 231. In FIG. 19, the slits 37 may be arranged in a direction perpendicular to the surface where the electronic device 202 is placed. As the number of the slits 37 increases, more current flowing paths may be formed on the second conductors 33, and as the number of the current flowing paths increases, the quality factor or the like of the resonator 30 may be improved. When the quality factor or the like of the resonator 30 is improved, a coupling efficiency between the resonator 30 and other resonators can be improved.

The electronic device 202 may be placed on the above-described charging cradle 101, and when positioned within the electromagnetic field HT of the primary resonator T, the resonator 30 may induce current along the direction of the extending direction of the slits 37. For example, the resonator 30 may form an electromagnetic field HR in a direction perpendicular to the extending direction of the slits 37 or in a direction where the slits 37 are arranged. When the electronic device 202 is mounted on the charging cradle 101, the electromagnetic field HT formed by the primary resonator T and the electromagnetic field HR formed by the resonator 30 may be formed to be parallel to each other or to be inclined to each other. For example, the electromagnetic field HR formed by the resonator 30 may be formed such that at least some of the vector components thereof are parallel to the electromagnetic field HT formed by the primary resonator T. Accordingly, a good electromagnetic field coupling may be formed between the primary resonator T and the resonator 30, and good wireless power transmission/reception is enabled between the charging cradle 101 and the electronic device 202. In this way, the resonator according to various embodiments of the present disclosure can sufficiently secure wireless power transmission/reception efficiency by being properly disposed along the placement direction of the electronic device 202, or along the direction of the electromagnetic field formed by the primary resonator of the charging cradle 101.

The resonator 30 may be disposed at one or more of the places indicated by "V" in FIG. 19, and may also be positioned at other points on the electronic device 202. The number, positions, etc. of resonators 30 disposed in the electronic device 202 may be changed in consideration of wireless power transmission/reception efficiency, the shape, the mounted state of the electronic device 202, etc.

When the electronic device 202 is mounted on a wireless power transmission device in which a resonator forming an electromagnetic field is included, for example, on the charging cradle 101, the resonator equipped in the electronic device 202 may form an electromagnetic field coupling with the resonator of the charging cradle 101 so as to generate an induced current so that charging power can be generated. For example, the electronic device 202 may be placed on the cradle 101 so that a battery embedded therein can be charged.

Figure 20:
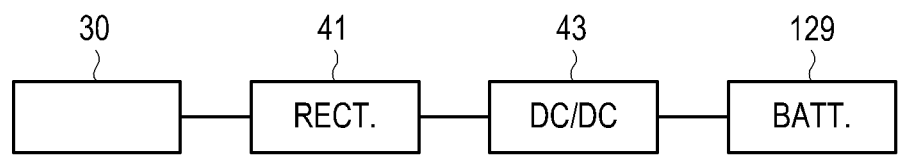
FIG. 20 is a view illustrating a configuration that uses for wireless power reception a resonator of an electronic device according to various embodiments of the present disclosure.

FIG. 20 is a view for disclosing a configuration that uses for wireless power reception a resonator of the electronic device according to various embodiments of the present disclosure.

Referring to FIG. 20, the resonator 30 may receive wireless power. When the resonator 30 is positioned within the electromagnetic field generated by the charging cradle 101, the resonator 30 may be excited by the electromagnetic field generated by the primary resonator of the charging cradle 101 to generate an induced current. When the resonator 30 is excited by the electromagnetic field to generate an induced current as described above, the power feeding unit F of the above-described embodiments may be replaced by a rectifier 41 or the like. For example, when the resonator 30 includes the power feeding unit F, the resonator 30 may be utilized as a transmission side resonator, and when the resonator 30 includes the rectifier 41, the resonator 30 may be utilized as a reception side resonator.

The induced current generated by the resonator 30 by the electromagnetic coupling is an AC current and may be converted into a DC current through the rectifier 41. The induced current generated by the resonator 30 may be converted to DC current by the rectifier 41 to be utilized as power for charging the battery (e.g., the battery 129 in FIG. 18) of an electronic device as described above (e.g., the above-mentioned electronic device 102 or 202).

According to various embodiments of the present disclosure, the electronic device (e.g., the electronic device 102 or 202) may further include a DC converter (DC-to-DC converter) 43. The DC converter 43 may increase or decrease the DC voltage to a voltage suitable for charging the battery 129.

As described above, an electronic device according to various embodiments of the present disclosure includes a resonator that generates induced current by electromagnetic coupling. The resonator includes a first conductor, a plurality of second conductors, one end of each of the second conductors being electrically coupled to a first point of the first conductor, and the other end of each of the second conductors being electrically coupled to a second point of the first conductor, and at least one load connected with the second conductors in series or in parallel, where the load may be an impedance load. Thus, the resonator may generate a loop type current that flows in the first and second conductors. The resonator of the electronic device as described above may generate induced current by electromagnetic field coupling, and when equipped in a battery-embedded electronic device, the resonator is connected with a rectifier or the like so that a charging power can be supplied to the battery embedded in the electronic device.

According to various embodiments of the present disclosure, the one end of each of the second conductors extends to the first conductor.

According to various embodiments of the present disclosure, the electronic device may further include a power feeding unit connected in series between the first and second conductors, and the power feeding unit may feed power to the second conductors.

According to various embodiments of the present disclosure, the impedance load may include a capacitive load or an inductive load that is connected in series between the first and second conductors at the other end of each of the second conductors.

According to various embodiments of the present disclosure, the electronic device may further include a power feeding unit that is connected in series between the first and second conductors. The power feeding unit may be connected with the impedance load in series or in parallel to feed power to the second conductors.

According to various embodiments of the present disclosure, the first conductor may be a flat plate that is made of a conductive material and provides a ground, and each of the second conductors may be a conductive flat plate disposed in parallel with the first conductor. The opposite ends of each of the second conductors may be bent to be close to the first conductor.

According to various embodiments of the present disclosure, the electronic device may further include a power feeding unit connected with the first and second conductors in series at the one end of each of the second conductors so as to feed power to the second conductors. The impedance load may be connected with the first and second conductors in series at the other end of each of the second conductors.

According to various embodiments of the present disclosure, the electronic device may further include at least one slit extending from the one end to the second end of each of the second conductors.

According to various embodiments of the present disclosure, the electronic device may further include a magnetic material or a dielectric material interposed between the first and second conductors.

According to various embodiments of the present disclosure, the second conductors may be formed in a multi-loop shape in which the second conductors extend in parallel to each other from the first conductor in a form of being branched at different first points, respectively, and the ends of the second conductors are positioned adjacent to different second points of the first conductor, respectively.

According to various embodiments of the present disclosure, the impedance load may be disposed between at least one of the ends of the second conductors and the first conductor.

According to various embodiments of the present disclosure, the electronic device may further include a power feeding unit disposed between another one of the second conductors and the first conductor, and the power feeding unit may feed power to the second conductors.

According to various embodiment of the present disclosure, the second conductors may form a multi-loop shape in which each of the opposite ends of the second conductors are positioned adjacent to the first conductor, and the impedance load may be disposed between at least one of the opposite ends of the second conductors and the first conductor.

According to various embodiments of the present disclosure, the electronic device may further include a power feeding unit disposed between another one of the opposite ends of the second conductors and the first conductor, and the power feeding unit may feed power to the second conductor.

According to various embodiments of the present disclosure, the electronic device may further include a main body, and a wearing part that allows the main body to be worn on a user's body. The resonator may be equipped in one of the main body and the wearing part.

According to various embodiments of the present disclosure, the electronic device may further include a conductive member provided on an outer surface of the main body or the wearing part, and the conductive member may form one of the first and second conductors.

According to various embodiments of the present disclosure, the main body may include a display device mounted on a front surface thereof, and the wearing part may include a pair of bands extending away from each other from the main body.

According to various embodiments of the present disclosure, the resonator may be embedded in one side of the display device, a rear surface of the main body, or at least one of the bands.

According to various embodiments of the present disclosure, the main body may include at least one lens and is worn to enclose at least a part of a user's face, and the wearing part may include temples that extend from the main body to be seated on the user's ears, respectively.

According to various embodiments of the present disclosure, the electronic device may further include a display unit mounted on the main body, the display unit projecting an image to be imaged on the lens. The resonator may be embedded in any one of the display unit and the temples.

While the present disclosure has been shown and described with reference to certain embodiments thereof, it will be understood by those skilled in the art that various changes in form and details may be made therein without departing from the spirit and scope of the present disclosure as defined by the appended claims.

What is claimed:
1. An electronic device comprising:
a resonator configured to generate an induced current by electromagnetic coupling,
wherein the resonator includes:
a first conductor;
a plurality of second conductors, one end of each of the plurality of second conductors being electrically coupled to a first point of the first conductor, and an other end of each of the plurality of second conductors electrically coupled to a second point of the first conductor; and
at least one impedance load connected with at least one of the plurality of second conductors in series or in parallel, wherein:
the resonator comprises a plurality of loop shapes, each of the plurality of the loop shapes being formed by each of the plurality of second conductors, and
the resonator generates a plurality of loop type currents each of which flows through the first conductor and a corresponding second conductor of the plurality of second conductors.

2. The electronic device of claim 1, wherein the one end of each of the plurality of second conductors extends towards the first conductor.

3. The electronic device of claim 1, further comprising:
a power feeding unit connected in series between the first conductor and the plurality of second conductors, wherein the power feeding unit is configured to supply power to the plurality of second conductors.

4. The electronic device of claim 1, wherein the impedance load includes a capacitive load or an inductive load that is connected in series between the first conductor and the plurality of second conductors at the other end of each of the plurality of second conductors.

5. The electronic device of claim 4, further comprising:
a power feeding unit that is connected in series between the first conductor and the plurality of second conductors,
wherein the power feeding unit is connected with the impedance load in series or in parallel to feed power to the plurality of second conductors.

6. The electronic device of claim 1, wherein:
the first conductor is a flat plate that is made of a conductive material and provides a ground, and
each of the plurality of second conductors is a conductive flat plate disposed in parallel with the first conductor, the one end and the other end of each of the plurality of second conductors bent to be close to the first conductor.

7. The electronic device of claim 6, further comprising:
a power feeding unit connected with the first conductor and the plurality of second conductors in series at the one end of each of the plurality of second conductors so as to feed power to the plurality of second conductors,
wherein the impedance load is connected with the first conductor and the plurality of second conductors in series at the other end of each of the plurality of second conductors.

8. The electronic device of claim 6, further comprising:
at least one slit extending from the one end of each of the plurality of second conductors to the other end of each of the plurality of second conductors.

9. The electronic device of claim 6, further comprising:
a magnetic material or a dielectric material interposed between the first conductor and the plurality of second conductors.

10. The electronic device of claim 1, wherein:
the plurality of second conductors are formed in the plurality of loop shapes in which the plurality of second conductors extend in parallel to each other from the first conductor in a form of being branched at different first points, respectively, and
the one end and the other end of each of the plurality of second conductors are positioned adjacent to different second points of the first conductor, respectively.

11. The electronic device of claim 10, wherein the impedance load is disposed between at least one of the one end and the other end of each of the plurality of second conductors, and the first conductor.

12. The electronic device of claim 11, further comprising:
a power feeding unit disposed between another one of the plurality of second conductors and the first conductor, and
the power feeding unit feeds power to the plurality of second conductors.

13. The electronic device of claim 1, wherein:
the plurality of second conductors form the plurality of loop shapes in which the one end and the other end of each of the plurality of second conductors are positioned adjacent to the first conductor, and
the impedance load is disposed between at least one of the opposite ends of the plurality of second conductors and the first conductor.

14. The electronic device of claim 13, further comprising:
a power feeding unit disposed between another one of the opposite ends of the plurality of second conductors and the first conductor,
wherein the power feeding unit is configured to feed power to the plurality of second conductors.

15. An electronic device comprising:
a main body;
a wearing part that allows the main body to be worn on a user's body; and
a resonator configured to generate an induced current by electromagnetic coupling,
wherein the resonator is equipped in one of the main body and the wearing part and includes:
a first conductor;
a plurality of second conductors, one end of each of the second conductors being electrically coupled to a first point of the first conductor, and an other end of each of the plurality of second conductors electrically coupled to a second point of the first conductor; and
at least one impedance load connected with the second conductors in series or in parallel, wherein the resonator generates a loop type current that flows in the first conductor and the plurality of second conductors.

16. The electronic device of claim 15, further comprising:
a conductive member provided on an outer surface of the main body or the wearing part,
wherein the conductive member forms one of the first conductor and the plurality of second conductors.

17. The electronic device of claim 15, wherein:
the main body includes a display device mounted on a front surface thereof, and
the wearing part includes a pair of bands extending away from each other from the main body.

18. The electronic device of claim 17, wherein the resonator is embedded in one side of the display device, a rear surface of the main body, or at least one of the bands.

19. The electronic device of claim 15, wherein:
the main body includes at least one lens and is seated to enclose at least a part of a user's face, and
the wearing part includes temples extending from the main body to be seated on ears of the user, respectively.

20. The electronic device of claim 19, further comprising:
a display unit mounted on the main body, the display unit configured to project an image on the lens,
wherein the resonator is embedded in at least one of the display unit and the temples.

* * * * *